C. DAVENPORT.
COMBINATION COOKER.
APPLICATION FILED FEB. 21, 1911. RENEWED SEPT. 6, 1913.
1,091,636.
Patented Mar. 31, 1914.
2 SHEETS—SHEET 1.
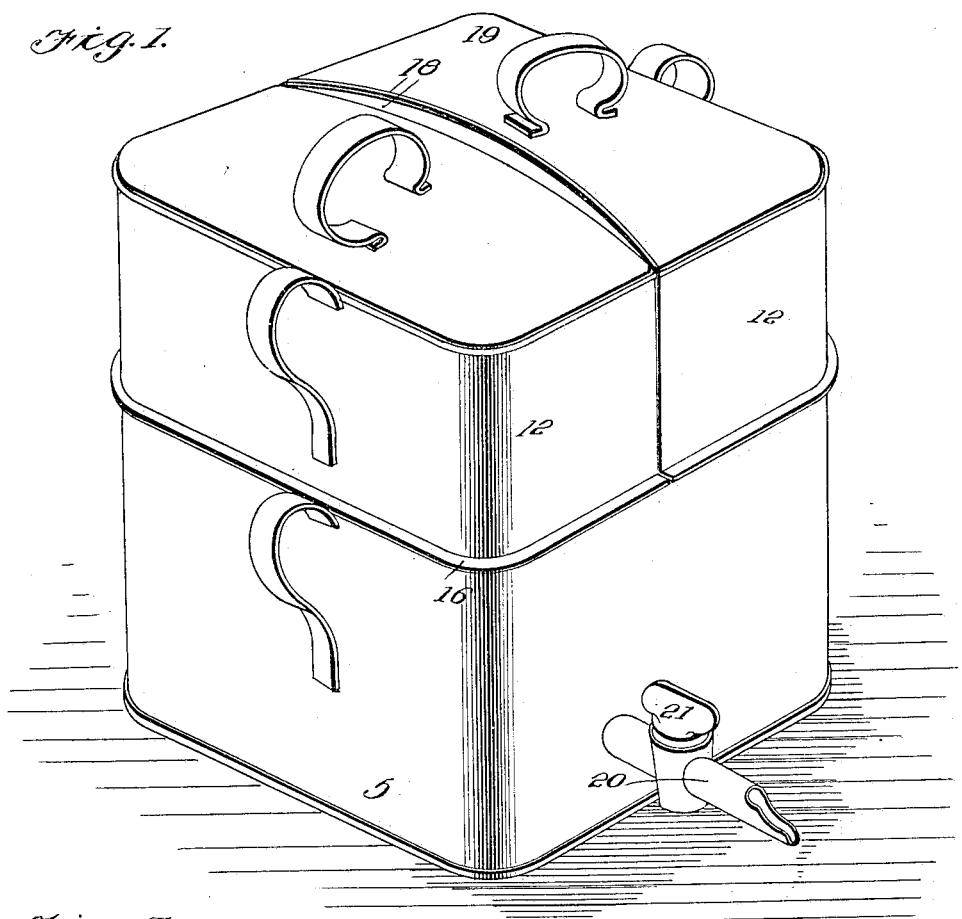
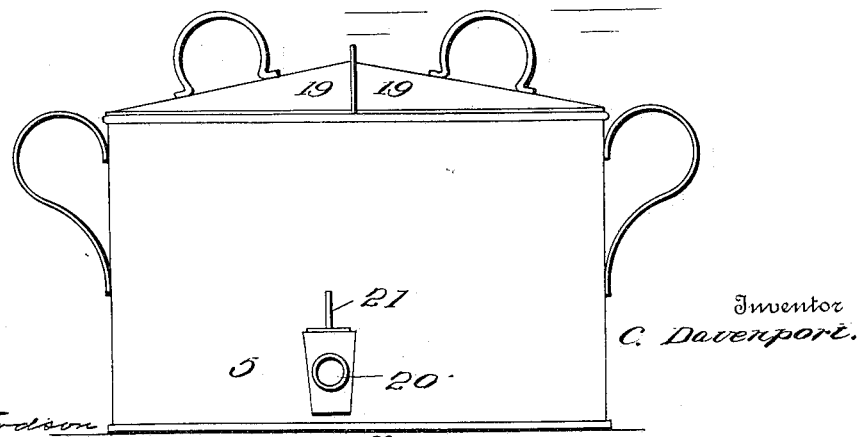

C. DAVENPORT.
COMBINATION COOKER.
APPLICATION FILED FEB. 21, 1911. RENEWED SEPT. 6, 1913.
1,091,636.
Patented Mar. 31, 1914.
2 SHEETS—SHEET 2.
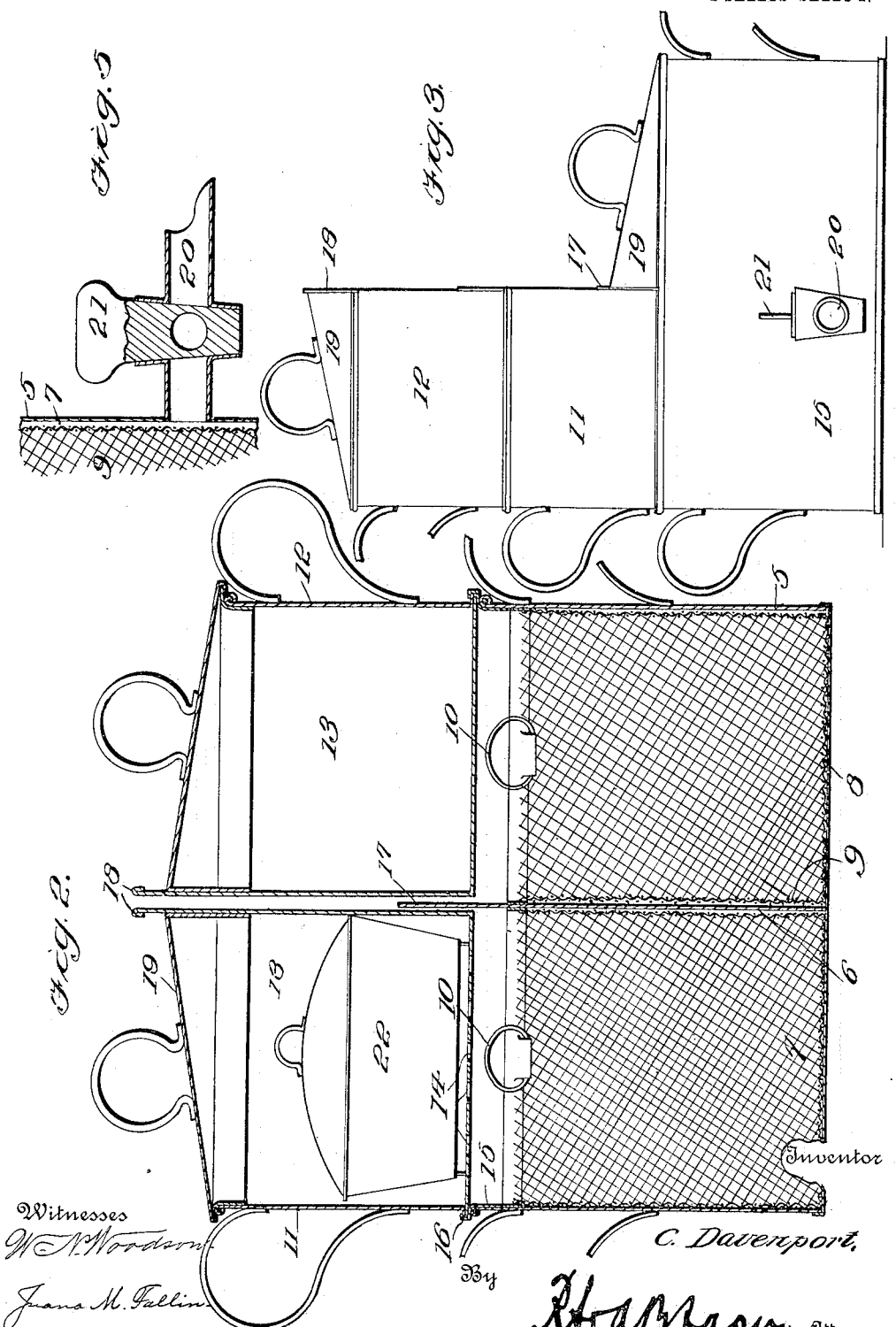

UNITED STATES PATENT OFFICE.

CAROLINE DAVENPORT, OF UNIVERSITY PLACE, NEBRASKA.

COMBINATION-COOKER.

1,091,636.  Specification of Letters Patent.  Patented Mar. 31, 1914.

Application filed February 21, 1911, Serial No. 610,025. Renewed September 6, 1913. Serial No. 788,452.

*To all whom it may concern:*

Be it known that I, CAROLINE DAVENPORT, a citizen of the United States, residing at University Place, in the county of Lancaster and State of Nebraska, have invented certain new and useful Improvements in Combination-Cookers, of which the following is a specification.

This invention relates to domestic cookers and has for its object the provision of a comparatively simple and thoroughly efficient device of this character having a plurality of independent compartments so that several different kinds of vegetables or meats may be cooked at one time in a single vessel without liability of the odors or fumes arising from the food being cooked in one compartment affecting the food being cooked in the other compartments.

A further object of the invention is to provide a cooking utensil including main and auxiliary vessels, some of which are provided with perforated food containing baskets to facilitate the removal of the contents of said vessels.

A further object is to provide one of the compartments of the main vessel with a discharge pipe or spout so that soup or other liquid may be conveniently withdrawn from said compartment without the necessity of removing the auxiliary vessels.

A still further object of the invention is generally to improve this class of devices so as to increase their utility, durability and efficiency, as well as to reduce the cost of manufacture.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a cooking utensil constructed in accordance with my invention; Fig. 2 is a vertical sectional view of the same; Fig. 3 is a side elevation, showing the auxiliary vessels arranged one above the other on the main vessel; Fig. 4 is a side elevation, showing the auxiliary vessels removed and the covers placed in position on the main vessel; Fig. 5 is a detail vertical sectional view, showing one of the perforated baskets extended across the mouth of the discharge spout to form a screen for the latter.

Corresponding and like parts are referred to in the following description and indicated in all the views of the drawings by the same reference characters.

The improved cooker forming the subject matter of the present invention comprises a main receptacle 5, preferably substantially rectangular in shape and formed of metal or other suitable material, said vessel being provided with a transverse partition 6 defining intermediate compartments 7 and 8 adapted to receive vegetables, meats and the like. Disposed within the compartments 7 and 8, are perforated baskets 9, preferably formed of wire netting, said baskets resting on the bottom of the main vessel and having their upper portions provided with suitable handles 10 so that the baskets containing the vegetables or other food may be conveniently withdrawn from the vessel.

Arranged above the main vessel 5, are auxiliary vessels 11 and 12, each having an interior chamber or compartment 13 for the reception of food, the bottom of the vessel 11 being provided with perforations 14 to permit the passage of steam from the lower compartment 7 into the upper compartment 13. The auxiliary vessels 11 and 12 are provided with depending flanges 15 extending around the front and side walls thereof and adapted to bear against the interior walls of the main vessel 5, there being a reinforcing bead 16 extending horizontally from each auxiliary vessel at the flange 15 and adapted to bear against the upper edge of the vessel 5, as best shown in Fig. 2 of the drawings.

The upper end of the partition 6 is extended above the top of the main vessel 5 to form a vertically disposed lip 17 for contact with the rear walls of the adjacent auxiliary vessels 11 and 12, thus to center said auxiliary vessels with respect to the compartments 7 and 8.

The rear walls of the auxiliary vessels 11 and 12 are extended upwardly above the top thereof to form lips 18, similar in construction to the lip 17, the lips 18 forming a central barrier between the vessels 11 and 12 and serving to assist in preventing the odors or fumes arising from one of said auxiliary vessels from entering the other vessel. The auxiliary vessels 11 and 12 are provided with removable covers 19 which bear against the adjacent lips 18 with their upper surfaces preferably disposed in a plane slightly below the upper edges of said lips.

It will here be noted that the rear walls of the auxiliary vessels 11 and 12 are disposed in the same plane with the lips 18 so as to present a smooth unobstructed surface for contact with the lip 17 of the main vessel and thus permit the auxiliary vessels to be compactly nested within said main vessel. It will also be noted that the covers 19 are of such a size as to fit both the main vessel 5 and the auxiliary vessels 11 and 12.

Projecting laterally from the front of the main vessel, is a discharge pipe or trough 20, the inner end of which communicates with one of the compartments in said main vessel, preferably the compartment 7 so as to permit the withdrawal of soup or other liquid from said compartment when desired, without the necessity of removing the auxiliary vessels. The discharge pipe 20 is provided with a turning plug 21 by means of which the flow of liquid from the compartment 7 may be controlled at will. The bottom of the auxiliary vessel 12 is preferably solid so that said vessel may be used for making coffee, tea and the like.

A pan or other receptacle 22 is preferably arranged within the compartment of the auxiliary vessel 11 for steaming pudding and the like, although this pan may be dispensed with, if desired.

In using the cooker, the compartments 7 and 8 are partially filled with water, after which meat is placed in the perforated basket 9 of one of said compartments and vegetables, such as potatoes and the like, in the other. The compartments 13 of the auxiliary vessels are then filled or partially filled with food and said auxiliary vessels placed in position on the main vessel, as best shown in Fig. 2 of the drawings, after which the device is placed on a stove and the water in the main vessel allowed to boil in the usual manner. The steam arising from the liquid in the compartment 8 will thoroughly heat the contents of the auxiliary vessel 12, while the steam from the compartment 7 will pass through the perforated bottom of the auxiliary vessel 11 and effect the cooking of the contents of the receptacle 22. By detaching the auxiliary vessel 12 and elevating the basket 9, the potatoes or other vegetables in the compartment 8 may be conveniently removed without breaking or crushing the same. After the soup is thoroughly cooked, the device may be placed on the rear end of the stove and the soup withdrawn from the compartment 7 through the discharge pipe from time to time as needed, without the necessity of detaching or removing the auxiliary vessels.

The auxiliary vessels 11 and 12 may be arranged above the compartments 7 and 8, or one above the other, as best shown in Fig. 3 of the drawings. The auxiliary vessels 11 and 12 may also be detached and the covers thereof placed in position on the main vessel 5, as best shown in Fig. 4.

Attention is here called to the fact that the perforated basket in the compartment 7 extends transversely across the inner end of the discharge pipe so as to form in effect a strainer and prevent large pieces of meat, potatoes and the like from entering the discharge pipe and clogging or otherwise obstructing the same.

It will of course be understood that as many auxiliary vessels may be employed as may be found desirable or necessary, and that one of the perforated baskets 9 may be arranged within each cooking compartment, without departing from the spirit of the invention.

A cooker constructed in accordance with this invention will effect a material saving in fuel, inasmuch as an entire dinner may be cooked over a single gas burner.

Having thus described the invention, what is claimed as new is:

1. A cooker including a main vessel having a transverse partition defining independent food receiving compartments, the upper end of the partition being projected in a vertical plane above the top of the vessel to form an upstanding lip extending entirely across said main vessel, auxiliary vessels disposed above the main vessel and having flanges fitting within and bearing against the interior walls of the compartments of said main vessel and provided with flat vertical rear walls adapted to bear against the upstanding lip of the partition, a discharge pipe communicating with one of the compartments of the main vessel, a valve for controlling the flow of liquid through said discharge pipe, and a perforated food containing basket seated in one of the compartments of the main vessel and having a portion thereof extended transversely across the inner end of the discharge pipe to form a screen for the latter.

2. A cooker including a main vessel having a transverse partition defining independent food receiving compartments, the upper end of the partition being projected vertically above the top of the vessel to form an upstanding lip extending entirely across the main vessel, auxiliary vessels supported on the main vessel above said compartments and having flat rear walls bearing against the upstanding lip of the partition, the flat rear walls of the auxiliary vessels being extended above the tops thereof to form similar lips, and interchangeable covers forming closures for the auxiliary vessels and bearing against the upstanding lips of said auxiliary vessels, said covers serving as closures for the compartments of the main vessel when the auxiliary vessels are removed.

3. A cooker including a main vessel having a transverse partition defining independent food receiving compartments, auxiliary vessels having depending flanges fitting within the compartments of the main vessel and provided with laterally extending reinforcing beads bearing against the upper edge of the main vessel, the bottom of one of the auxiliary vessels being solid and the bottom of the other perforated, interchangeable covers forming closures for the auxiliary vessels and capable of being used as closures for the compartments of the main vessel, a discharge pipe communicating with one of the compartments of the main vessel, a valve arranged within said discharge pipe for controlling the flow of liquid therethrough, and a perforated food containing basket arranged within one of the compartments and forming a screen for the inner end of the discharge pipe.

4. A cooker including a main vessel having a vertical transverse partition defining independent food receiving compartments, the upper end of the partition being projected vertically above the top of the vessel to form an upstanding lip, auxiliary vessels fitting within the compartments of the main vessel and having flat rear walls bearing against the upstanding lip, interchangeable covers forming closures for the auxiliary vessels and capable of being used as closures for the compartments of the main vessel, a discharge pipe communicating with one of the compartments of the main vessel, a valve arranged within said discharge pipe for controlling the flow of liquid therethrough, and a perforated food containing basket arranged within one of the compartments and forming a screen for the inner end of the discharge pipe.

In testimony whereof, I affix my signature in presence of two witnesses.

CAROLINE DAVENPORT. [L. S.]

Witnesses:
  THOMAS J. DOYLE,
  CARRIE L. AKESON.

---

Copies of this patent may be obtained for five cents each, by addressing the "Commissioner of Patents, Washington, D. C."